United States Patent
Mitsuishi

(10) Patent No.: US 10,359,829 B2
(45) Date of Patent: Jul. 23, 2019

(54) SEMICONDUCTOR DEVICE FOR GENERATING A CLOCK BY PARTIALLY ENABLING OR DISABLING A SOURCE CLOCK SIGNAL

(71) Applicant: Renesas Electronics Corporation, Tokyo (JP)

(72) Inventor: Naoki Mitsuishi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 61 days.

(21) Appl. No.: 15/079,324

(22) Filed: Mar. 24, 2016

(65) Prior Publication Data
US 2016/0334831 A1    Nov. 17, 2016

(30) Foreign Application Priority Data
May 15, 2015  (JP) .................... 2015-099812

(51) Int. Cl.
*G06F 1/04*    (2006.01)
*G06F 1/06*    (2006.01)
(Continued)

(52) U.S. Cl.
CPC ............... *G06F 1/324* (2013.01); *G06F 1/08* (2013.01); *G06F 1/3206* (2013.01);
(Continued)

(58) Field of Classification Search
CPC ...... G06F 1/324; G06F 1/3206; G06F 1/3237; G06F 1/08; G06F 1/04; G06F 1/06; Y02B 60/1217
(Continued)

(56) References Cited

U.S. PATENT DOCUMENTS

| | | | |
|---|---|---|---|
| 6,407,595 B1 * | 6/2002 | Huang | G06F 1/206 327/105 |
| 7,954,101 B2 | 5/2011 | Adachi et al. | |

(Continued)

FOREIGN PATENT DOCUMENTS

| | | |
|---|---|---|
| JP | 2004-013820 A | 1/2004 |
| JP | 2005-346301 A | 12/2005 |

(Continued)

OTHER PUBLICATIONS

Japanese Office Action dated Jul. 10, 2018, with an English translation thereof.

*Primary Examiner* — Ji H Bae
(74) *Attorney, Agent, or Firm* — McGinn I.P. Law Group, PLLC

(57) ABSTRACT

It is to provide a technique capable of controlling the throughput and the power consumption of a semiconductor device at a desired ratio. A semiconductor device includes a clock generation circuit that generates a clock signal and a data processing unit that receives the clock signal. The clock generation circuit includes an oscillator that generates a source clock signal, an output circuit that outputs a clock signal with the source clock signal enabled, and a control circuit having a setting circuit in which the data processing unit sets the ratio of the enable. The semiconductor device can change the frequency of the clock signal by partially permitting or prohibiting the source clock signal in time.

18 Claims, 15 Drawing Sheets

(51) Int. Cl.
  *G06F 1/08* (2006.01)
  *G06F 1/324* (2019.01)
  *G06F 1/3206* (2019.01)
  *G06F 1/3237* (2019.01)

(52) U.S. Cl.
  CPC .............. *G06F 1/3237* (2013.01); *G06F 1/04* (2013.01); *G06F 1/06* (2013.01); *Y02D 10/126* (2018.01)

(58) Field of Classification Search
  USPC .................................................. 713/500, 322
  See application file for complete search history.

(56) References Cited

U.S. PATENT DOCUMENTS

| | | | |
|---|---|---|---|
| 8,645,742 B2 | 2/2014 | Mitsuishi | |
| 8,671,380 B2 | 3/2014 | Wang et al. | |
| 2002/0087904 A1* | 7/2002 | Cai | G06F 1/206 713/322 |
| 2009/0019303 A1* | 1/2009 | Rowland | G06F 1/08 713/501 |
| 2010/0150271 A1* | 6/2010 | Brown | G06F 1/08 375/324 |
| 2010/0162063 A1* | 6/2010 | Teyssier | G06F 1/10 714/735 |
| 2012/0233488 A1* | 9/2012 | Burchard | G06F 1/3228 713/500 |
| 2013/0082747 A1* | 4/2013 | Kris | G06F 1/04 327/114 |
| 2013/0191677 A1* | 7/2013 | Ziesler | G06F 1/3237 713/500 |
| 2014/0223211 A1* | 8/2014 | Ries | G06F 1/206 713/322 |
| 2015/0280901 A1* | 10/2015 | Hafuka | H04L 7/027 375/355 |
| 2015/0355671 A1* | 12/2015 | Coutts | G06F 1/08 713/503 |
| 2017/0068296 A1* | 3/2017 | Mair | G06F 1/3296 |

FOREIGN PATENT DOCUMENTS

| | | |
|---|---|---|
| JP | 2011-114630 A | 6/2011 |
| JP | 2013-027050 A | 2/2013 |

\* cited by examiner

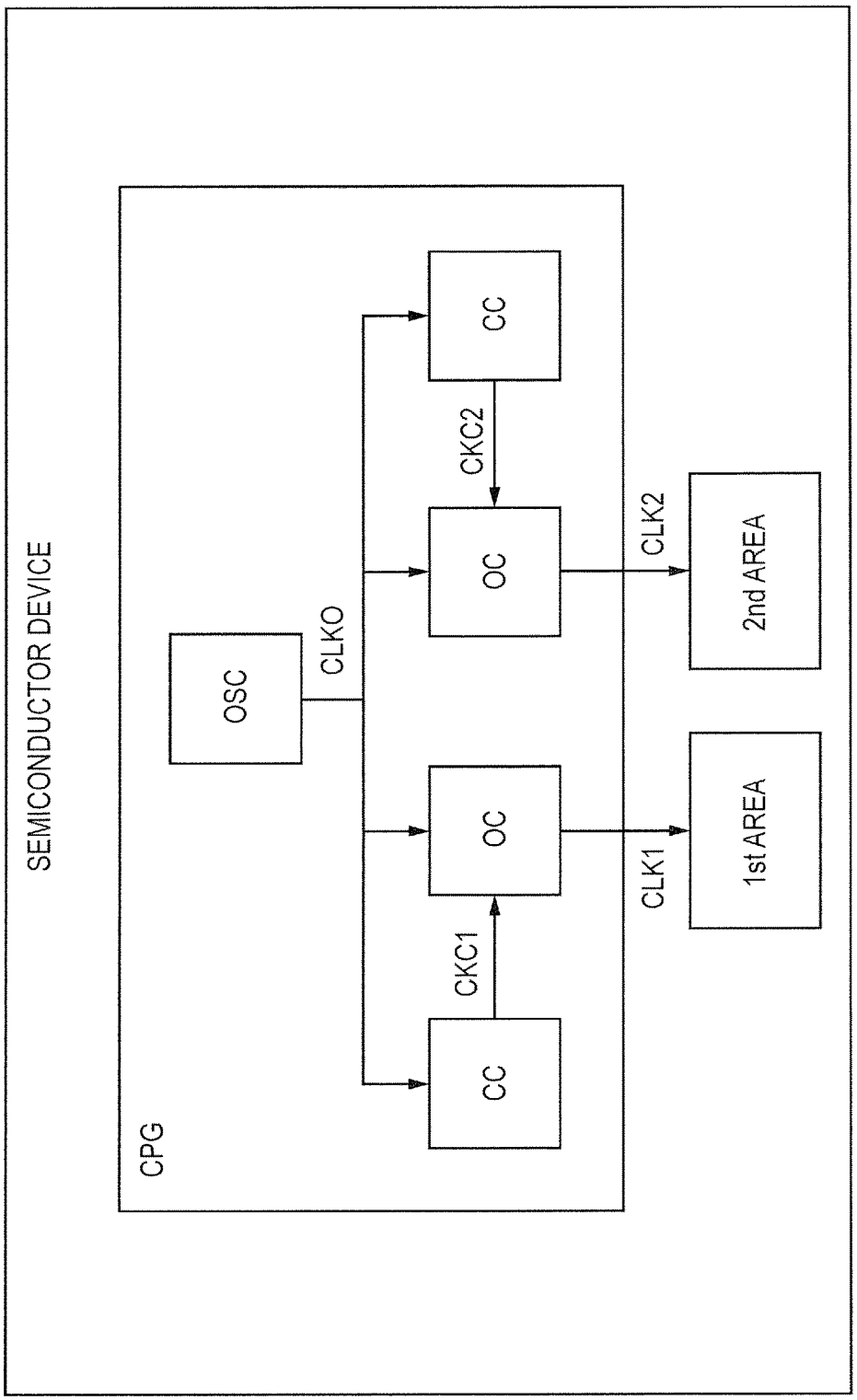

FIG. 6

| DR | CNT_INT≧255-DR | CNT |
|---|---|---|
| 0000 1000 (8) | 1111 0111 (247) | 1110 1111 (239) |
| 0000 0111 (7) | 1111 1000 (248) | 0001 1111 (31) |
| 0000 0110 (6) | 1111 1001 (249) | 1001 1111 (159) |
| 0000 0101 (5) | 1111 1010 (250) | 0101 1111 (95) |
| 0000 0100 (4) | 1111 1011 (251) | 1101 1111 (223) |
| 0000 0011 (3) | 1111 1100 (252) | 0011 1111 (63) |
| 0000 0010 (2) | 1111 1101 (253) | 1011 1111 (191) |
| 0000 0001 (1) | 1111 1110 (254) | 0111 1111 (127) |
| 0000 0000 (0) | 1111 1111 (255) | 1111 1111 (255) |

FIG. 7

| DR \ CNT | 0 | 1 | 2 | 3 | 4 | ... | 62 | 63 | 64 | ... | 126 | 127 | 128 | ... | 190 | 191 | 192 | ... | 254 | 255 |
|---|---|---|---|---|---|---|---|---|---|---|---|---|---|---|---|---|---|---|---|---|
| 0 | | | | | | | | | | | | | | | | | | | | ○ |
| 1 | | | | | | | | | | | | ○ | ○ | | | ○ | ○ | | ○ | ○ |
| 2 | | | | | | | | | | | ○ | ○ | ○ | | ○ | ○ | ○ | | ○ | ○ |
| 3 | | | | ○ | ○ | | ○ | ○ | ○ | | ○ | ○ | ○ | | ○ | ○ | ○ | | ○ | ○ |
| 4 | | | | | | | | | | | | | | | | | | | ○ | ○ |
| ... | | | | | | | | | | | | | | | | | | | ○ | ○ |
| 62 | | | | | | | | | | | ○ | ○ | ○ | | ○ | ○ | ○ | | ○ | ○ |
| 63 | | | | ○ | ○ | | ○ | ○ | ○ | | ○ | ○ | ○ | | ○ | ○ | ○ | | ○ | ○ |
| 64 | | | | | | | | | | | | | | | | | | | ○ | ○ |
| ... | | | | | | | | | | | | | | | | | | | ○ | ○ |
| 126 | | | | | | | | | | | ○ | ○ | ○ | | ○ | ○ | ○ | | ○ | ○ |
| 127 | | ○ | ○ | ○ | ○ | | ○ | ○ | ○ | | ○ | ○ | ○ | | ○ | ○ | ○ | | ○ | ○ |
| 128 | | | | | | | | | | | | | | | | | | | ○ | ○ |
| ... | | | | | | | | | | | | | | | | | | | ○ | ○ |
| 190 | | | | | | | | | | | ○ | ○ | ○ | | ○ | ○ | ○ | | ○ | ○ |
| 191 | | | ○ | ○ | ○ | | ○ | ○ | ○ | | ○ | ○ | ○ | | ○ | ○ | ○ | | ○ | ○ |
| 192 | | | | | | | | | | | | | | | | ○ | | | ○ | ○ |
| ... | | | | | | | | | | | | | | | | | | | ○ | ○ |
| 254 | | | | | | | | | | | | | | | ○ | | ○ | ○ | ○ | ○ |
| 255 | ○ | ○ | ○ | ○ | ○ | | ○ | ○ | ○ | | ○ | ○ | ○ | | ○ | ○ | ○ | | ○ | ○ |

FIG. 12

| | | | | | |
|---|---|---|---|---|---|
| WR | | FF | | | FF |
| DR | 00 | 3F | 7F | BF | FF |

SEMICONDUCTOR DEVICE FOR GENERATING A CLOCK BY PARTIALLY ENABLING OR DISABLING A SOURCE CLOCK SIGNAL

CROSS-REFERENCE TO RELATED APPLICATIONS

The disclosure of Japanese Patent Application No. 2015-099812 filed on May 15, 2015 including the specification, drawings and abstract is incorporated herein by reference in its entirety.

BACKGROUND

This disclosure relates to a semiconductor device and is applicable to, for example, a semiconductor device operating according to a predetermined operation clock.

A microcomputer as an example of a semiconductor device is widely used for the purpose of equipment control. Low power consumption in a semiconductor device is an important challenge to extend a continuous usable time (battery lifetime) and save energy in a portable device. Especially, in a small-sized portable device, it is difficult to set a power device for supplying a sufficient current, by the reason that there are demands for downsizing and price-reduction of a system other than the demand for continuous operation; therefore, a strict limitation is often imposed on the maximum possibly consumable current of a semiconductor device. Further, according to downsizing of equipment, from the viewpoint of a thermal design, it is necessary to minutely control the power consumption.

Briefly speaking, power consumption of a semiconductor device is in proportion to an operating clock frequency. There has been used widely a method of reducing the power consumption by dividing a clock by 1/N (N is a natural number).

As the prior art document related to this disclosure, for example, there is Japanese Unexamined Patent Application Publication No. 2011-114630 or U.S. Pat. No. 8,645,742 corresponding to this.

[Patent Document 1] Japanese Unexamined Patent Application Publication No. 2011-114630

[Patent Document 2] U.S. Pat. No. 8,645,742

SUMMARY

In the above mentioned technique of diving a clock by 1/N, with the maximum settable clock frequency as a reference, throughput (processing performance) of a data processor such as CPU and power consumption becomes 1, 1/2, 1/4 time and the like. Therefore, the processing performance and the power consumption of a semiconductor device cannot be controlled at any other ratio than 1/N.

Problems and novel characteristics of this disclosure will be apparent from the description of the invention and the attached drawings.

Of the disclosure, outline of a typical one will be briefly described as follows.

A semiconductor device according to the embodiment is to generate a clock signal which is supplied to an area including a data processing unit by partially permitting or prohibiting a source clock signal.

According to the embodiment, it is possible to control the throughput and the power consumption of a semiconductor device at a ratio other than 1/N.

BRIEF DESCRIPTION OF THE DRAWINGS

FIG. 1D is a block diagram for use in describing a structure of a semiconductor device according to a third embodiment.

FIG. 6 is a view for use in describing an output form of clock enable signals from a clock generation circuit according to the first example.

FIG. 7 is a view for use in describing the output form of the clock enables signals from the clock generation circuit according to the first example.

FIG. 12 is a timing chart for use in describing the clock generation circuit according to the third modified example.

DETAILED DESCRIPTION

Hereinafter, embodiments, examples, and modified examples will be described using the drawings. In the following description, with the same codes attached to the same components, overlapping description may be saved.

At first, a technique of making processing performance and power consumption between one time speed and a half time speed, using the technique of dividing a clock by 1/N. For example, when the power consumption is desired to be suppressed to 75%, a onetime speed operation and a half speed operation have to be switched, which is inconvenient and requires another processing, consuming the power that is not needed originally. Even when the average power can be suppressed to 75%, power consumption is high at the one time speed operation, and in order to cope with this, power design has to be performed. When switching the one time speed operation and the half speed operation, there is a possibility of largely changing the power consumption and generating an undesirable voltage change; therefore, the power design to solve this problem has to be performed.

<Embodiment 1>

Figure 1A:
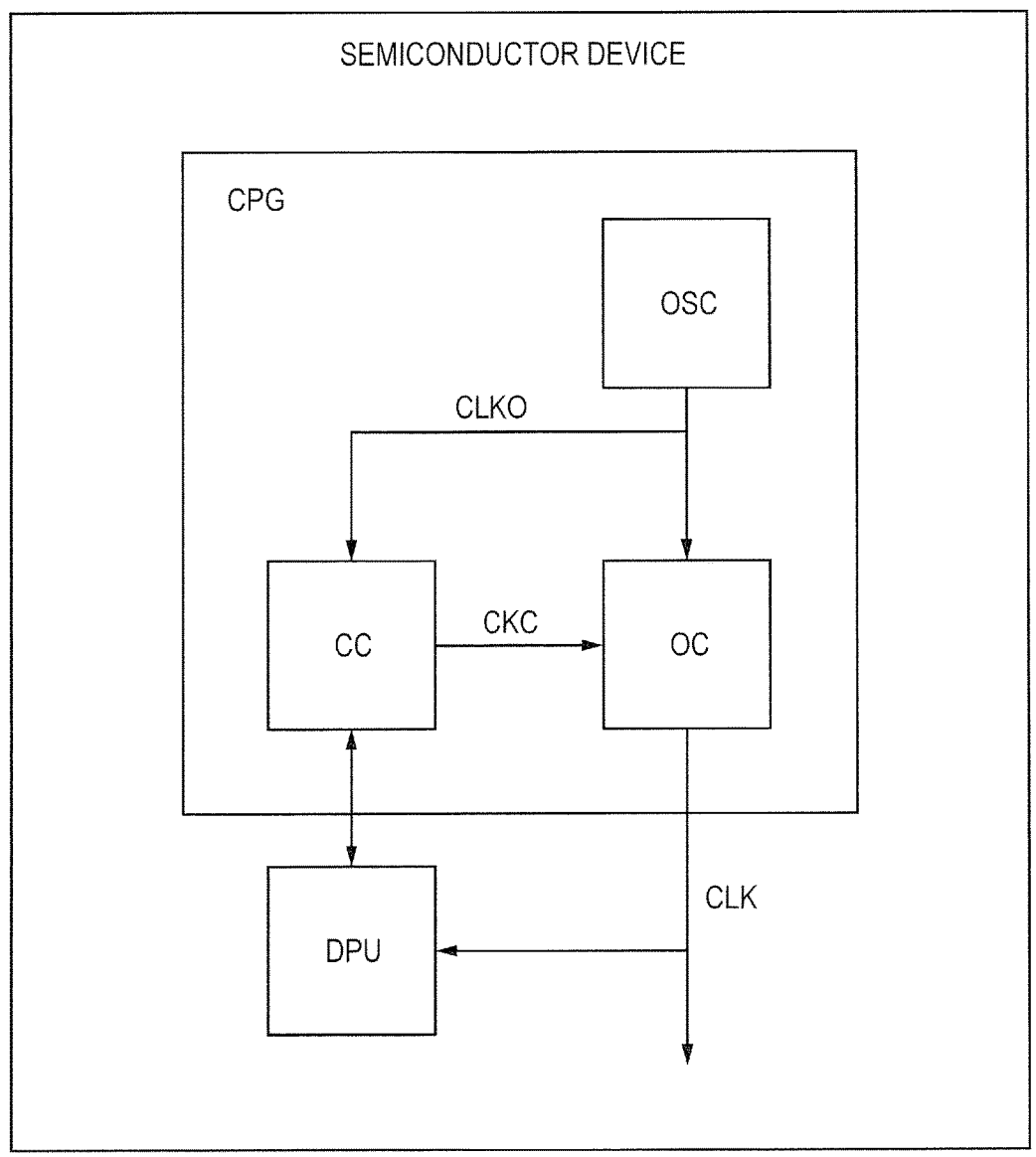
FIG. 1A is a block diagram for use in describing a structure of a semiconductor device according to a first embodiment.
Figure 1B:
FIG. 1B is a view for use in describing the waveform of a clock signal in the semiconductor device according to the first embodiment.

Next, a semiconductor device according to a first embodiment (embodiment 1) will be described using FIGS. 1A and 1B. FIG. 1A is a block diagram showing the structure of the semiconductor device according to the embodiment 1. FIG. 1B is a view showing the waveform of a clock signal in the semiconductor device according to the embodiment 1.

The semiconductor device according to the embodiment 1 includes a clock generation circuit (CPG) and a data processing unit (DPU). The clock generation circuit (CPG) includes an oscillator (OSC), a control circuit (CC) of generating a clock control signal (CKC) based on a source clock signal (CLKO) generated by the oscillator (OSC), and an output circuit (OC) of supplying a clock signal (CLK) after partially permitting (enable) or prohibiting (disable) the source clock signal (CLKO) with the clock control signal (CKC). The clock generation circuit (CPG) supplies the clock signal (CLK) to the data processing unit. The data processing unit (DPU) can set the ratio of permission or prohibition of the source clock signal (CLKO) in the control circuit (CC).

The dotted line of FIG. 1B indicates the source clock signal (CLKO) is prohibited. The clock signal (CLK) is also supplied to a function block other than the data processing unit (DPU).

In the dotted line portion of the clock signal (CLK), any clock pulse is not generated with the output of the source clock signal (CLKO) prohibited; in the solid line portion of the clock signal (CLK), clock pulse is generated with the output of the source clock signal (CLKO) permitted. According to this, the clock pulse number per unit time of the clock signal (CLK) can be changed and as the result, the clock signal (CLK) can be of a clock pulse number (frequency) other than 1/N of the source clock signal (CLKO). Accordingly, the semiconductor device according to the embodiment can achieve a desired performance and power consumption.

<Embodiment 2>

Figure 1C:
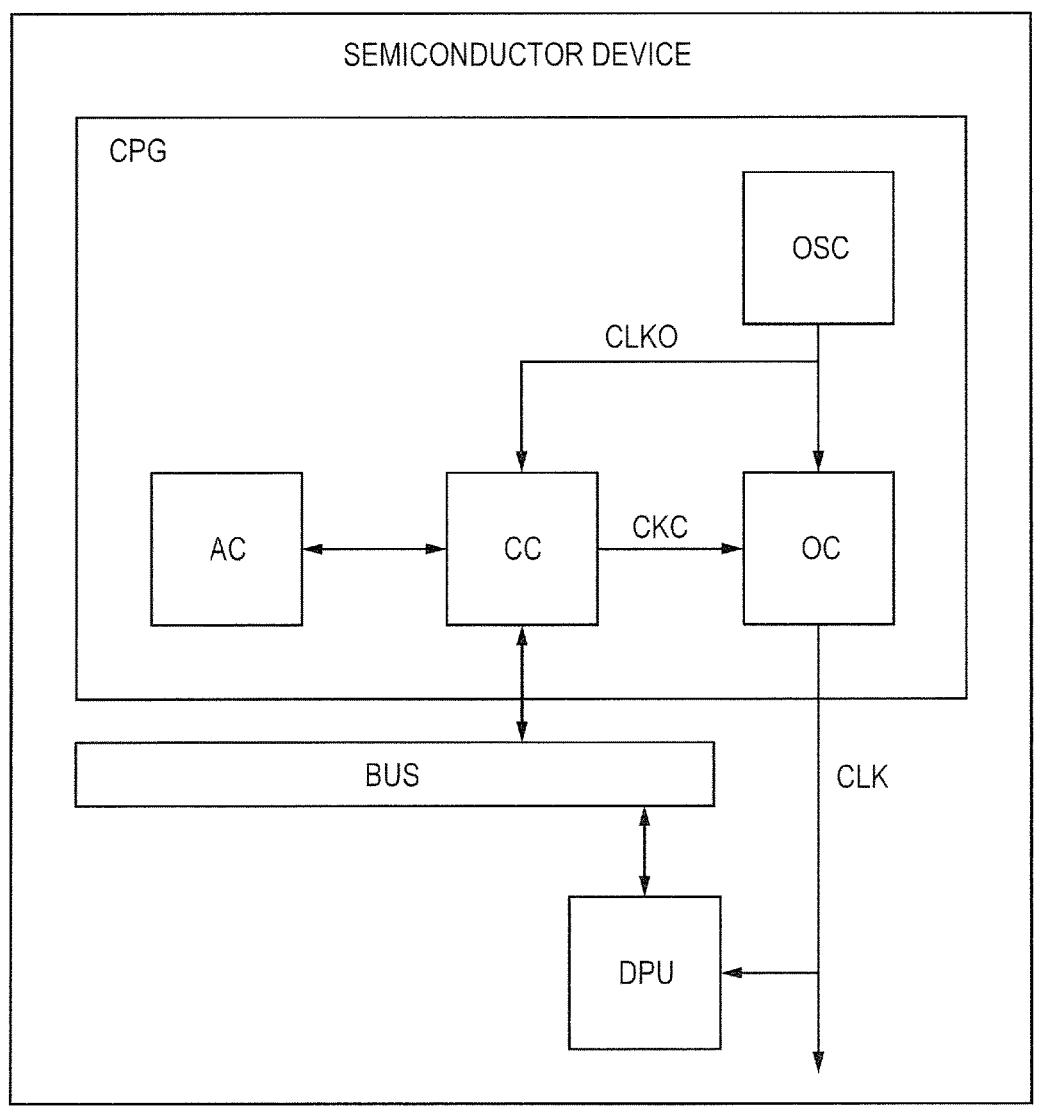
FIG. 1C is a block diagram for use in describing a semiconductor device according to a second embodiment.

Next, a semiconductor device according to a second embodiment (embodiment 2) will be described using FIG. 1C. FIG. 1C is a block diagram showing the structure of the semiconductor device according to the embodiment 2.

The semiconductor device according to the embodiment 2 includes a bus coupled to the clock generation circuit (CPG) and the data processing unit (DPU) and an alteration circuit (AC) that can change the contents of the control circuit (CC), in addition to the semiconductor device according to the embodiment 1. In other words, the semiconductor device according to the embodiment 2 includes the clock generation circuit (CPG), the data processing unit (DPU), and the bus (BUS). The clock generation circuit (CPG) includes the oscillator (OSC), the control circuit (CC), the output circuit (OC), and the alteration circuit (AC). The control circuit (CC) generates a clock control signal (CKC) based on the source clock signal (CLKO) generated in the oscillator (OSC). The output circuit (OC) partially permits or prohibits the source clock signal (CLKO) in time with the clock control signal (CKC) and outputs a clock signal (CLK). The alteration circuit (AC) can change the contents of the control circuit (CC) bypassing through any other than the bus (BUS). The data processing unit (DPU) can set the ratio of permitting or prohibiting the source clock signal (CLKO) in the control circuit (CC). The dotted line of FIG. 1E indicates that the source clock signal (CLKO) is prohibited. The clock signal (CLK) is also supplied to a function block other than the data processing unit (DPU).

Since the alteration circuit (AC) can change the ratio of permitting or prohibiting the source clock signal (CLKO), the data processing unit (DPU) does not have to change the contents of the control circuit (CC). This can make a control easy and automatic.

<Embodiment 3>

Figure 1E:
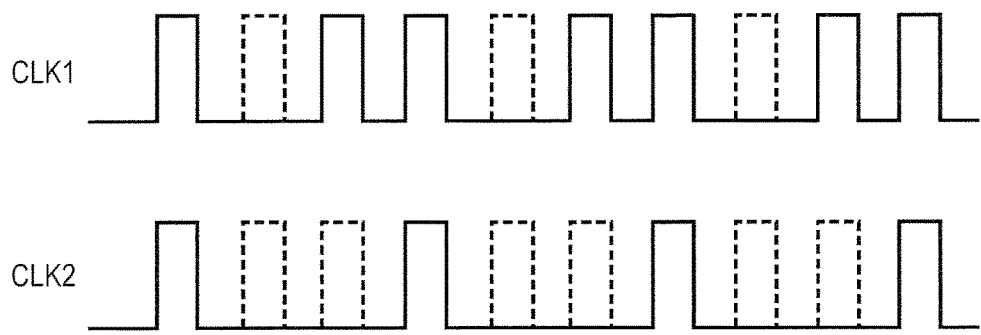
FIG. 1E is a view for use in describing the waveform of a clock signal in the semiconductor device according to the third embodiment.

Next, a semiconductor device according to a third embodiment (Embodiment 3) will be described using FIGS. 1D and 1E. FIG. 1D is a block diagram showing the structure of the semiconductor device according to the embodiment 3. FIG. 1E is a view showing the waveform of a clock signal in the semiconductor device according to the embodiment 3.

The semiconductor device according to the embodiment 3 includes at least two sets of the control circuit (CC) and the output circuit (OC) of the semiconductor device according to the embodiment 1, in which a first clock signal (CLK1) is supplied to a first area and a second clock signal (CLK2) is supplied to a second area. In other words, the semiconductor device according to the embodiment 3 includes a clock generation circuit (CPG) of generating the first clock signal (CLK1) and the second clock signal (CLK2), a first area for operation with the first clock signal (CLK1), and a second area for operation with the second clock signal (CLK2). The clock generation circuit (CPG) includes an oscillator (OSC), a first clock control circuit (CC), a first clock output circuit (OC), a second clock control circuit (CC), and a second clock output circuit (OC). The oscillator (OSC) generates a source clock signal. The first clock control circuit (CC) generates a first control signal (CKC) having a first duty. The first clock output circuit (OC) can output the first clock signal (CLK1) with the source clock signal (CLKO) partially permitted or prohibited in time based on the first control signal (CKC). The second clock control circuit (CC) generates a second control signal (CKC) having a second duty. The second clock output circuit (OC) can output the second clock signal (CLK2) with the source clock signal (CLKO) partially permitted or prohibited in time based on the second control signal (CKC).

Similarly to the embodiment 1, in the dotted line portion of the first clock signal (CLK1) and the second clock signal (CLK2), any clock pulse is not generated with the output of the source clock signal (CLKO) prohibited; in the solid line portion of the first clock signal (CLK1) and the second clock signal (CLK2), clock pulse is generated with the output of the source clock signal (CLKO) permitted. Thus, the clock pulse number (frequency) per unit time in the first clock signal (CLK1) and the second clock signal (CLK2) can be different from each other.

Since the rising edge and falling edge of the first clock signal (CLK1) and the second clock signal (CLK2) correspond to the rising edge and falling edge of the source clock signal (CLKO), an interface between the first area and the second area can be designed synchronously with the source clock signal (CLKO). This can make easy the interface design in the first area and the second area and simplify the structure.

The embodiment 2 and the embodiment 3 can be combined together. For example, the alteration circuit (AC) can be added to the semiconductor device according to the embodiment 3 to change the contents of the control circuit (CC).

EXAMPLE 1

Figure 2:
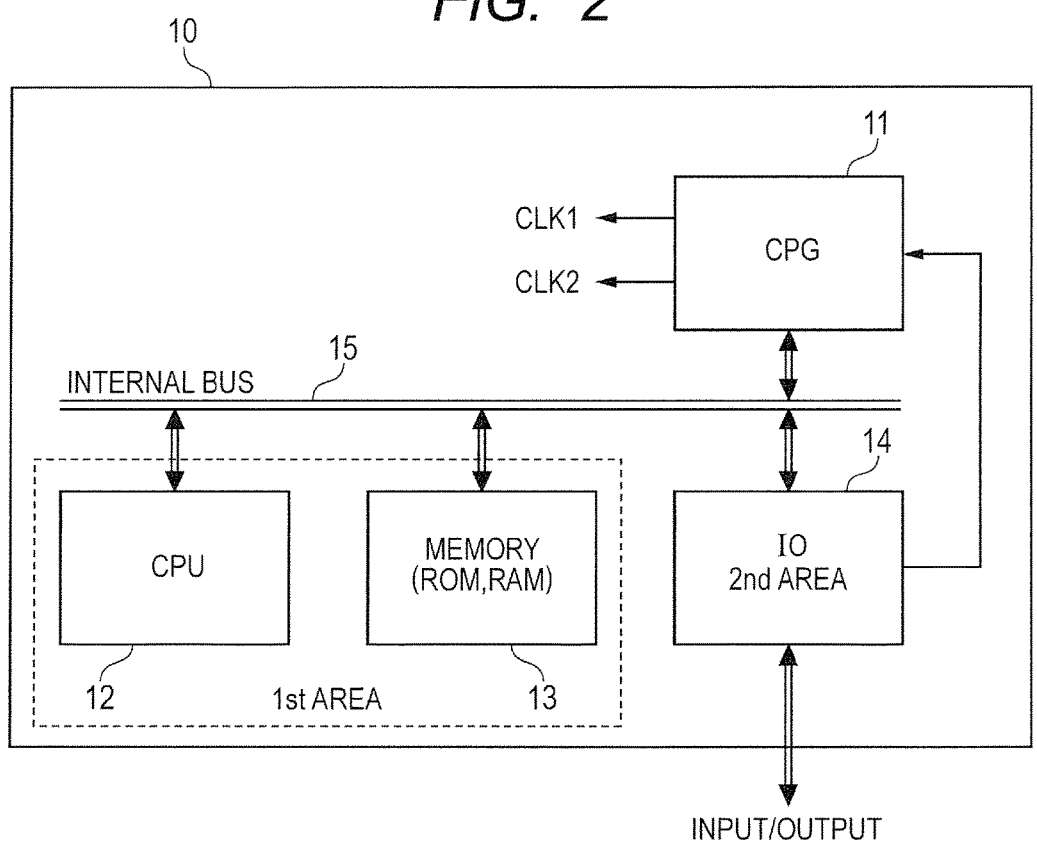
FIG. 2 is a block diagram for use in describing a microcomputer according to a first example.

At first, a microcomputer according to a first example (example 1) will be described using FIG. 2. FIG. 2 is a block diagram illustrating the structure of the microcomputer according to the example.

A microcomputer 10 as an example of the semiconductor device includes a clock generation circuit (CPG) 11, a CPU 12, a memory 13, and a peripheral circuit (IO) 14, and it is formed over one semiconductor substrate according to the well-known semiconductor manufacturing technique. The CPU 12 controls the whole operation of the microcomputer 10. The CPU 12 is an example of the data processing unit (DPU) in the semiconductor device according to the embodiment. The memory 13 includes a non-volatile memory (ROM) for storing an operation program of the CPU 12 and a volatile memory (RAM) for temporarily storing a working area of the CPU 12 and data. The peripheral circuit (IO) 14 includes a timer, a SCI (Serial Communication Interface), an A/D (Analog/Digital) converter, a port, and a sensor.

The function block of the microcomputer 10 is mutually coupled together through an internal bus 15. The CPU 12 reads and writes register included in the memory 13 and the peripheral circuit 14. The peripheral circuit 14 has various types of input and output terminals. The CPU 12 and the memory 13 are in the first area, where a clock signal for operation in the first area (hereinafter, abbreviated as "CLK1") is supplied from the clock generation circuit 11. The peripheral circuit 14 is in the second area, where a clock signal for operation in the second area (hereinafter, abbreviated as "CLK2") is supplied from the clock generation circuit 11. The first area and the second area can operate with the mutual different clock signals.

Figure 3:
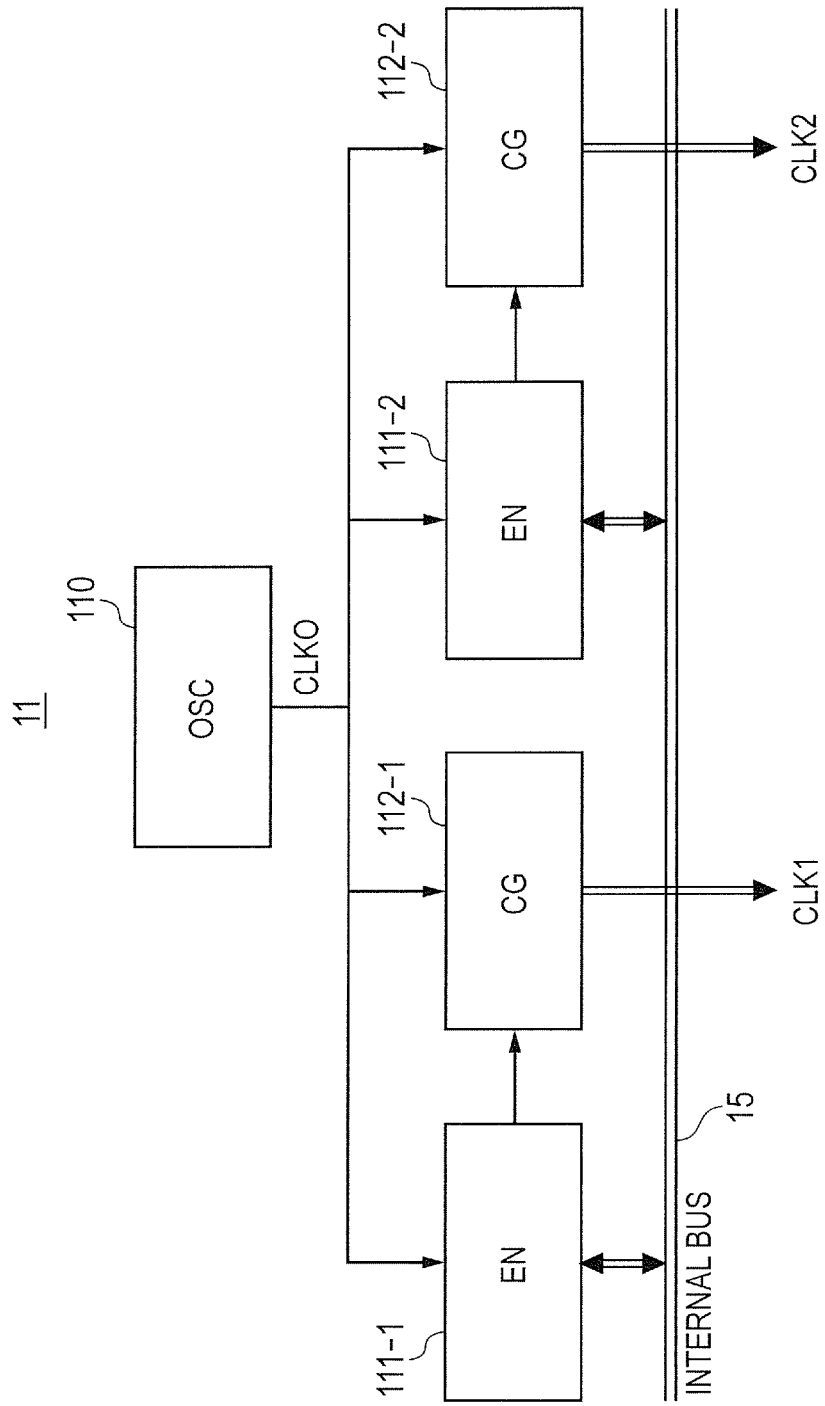
FIG. 3 is a block diagram for use in describing a clock generation circuit according to the first example.
Figure 4:
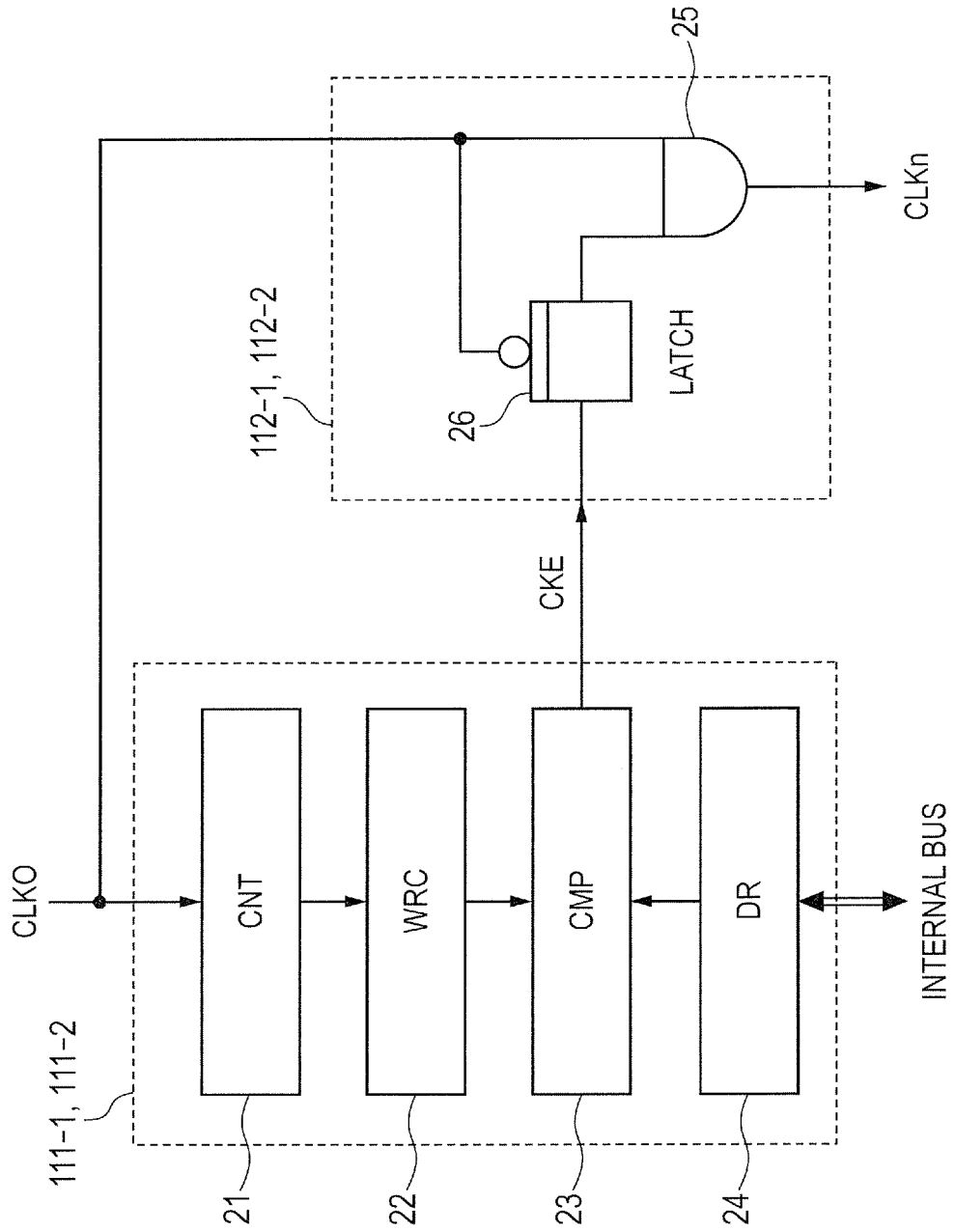
FIG. 4 is a block diagram for use in describing the detail of the clock generation circuit according to the first example.
Figure 5:
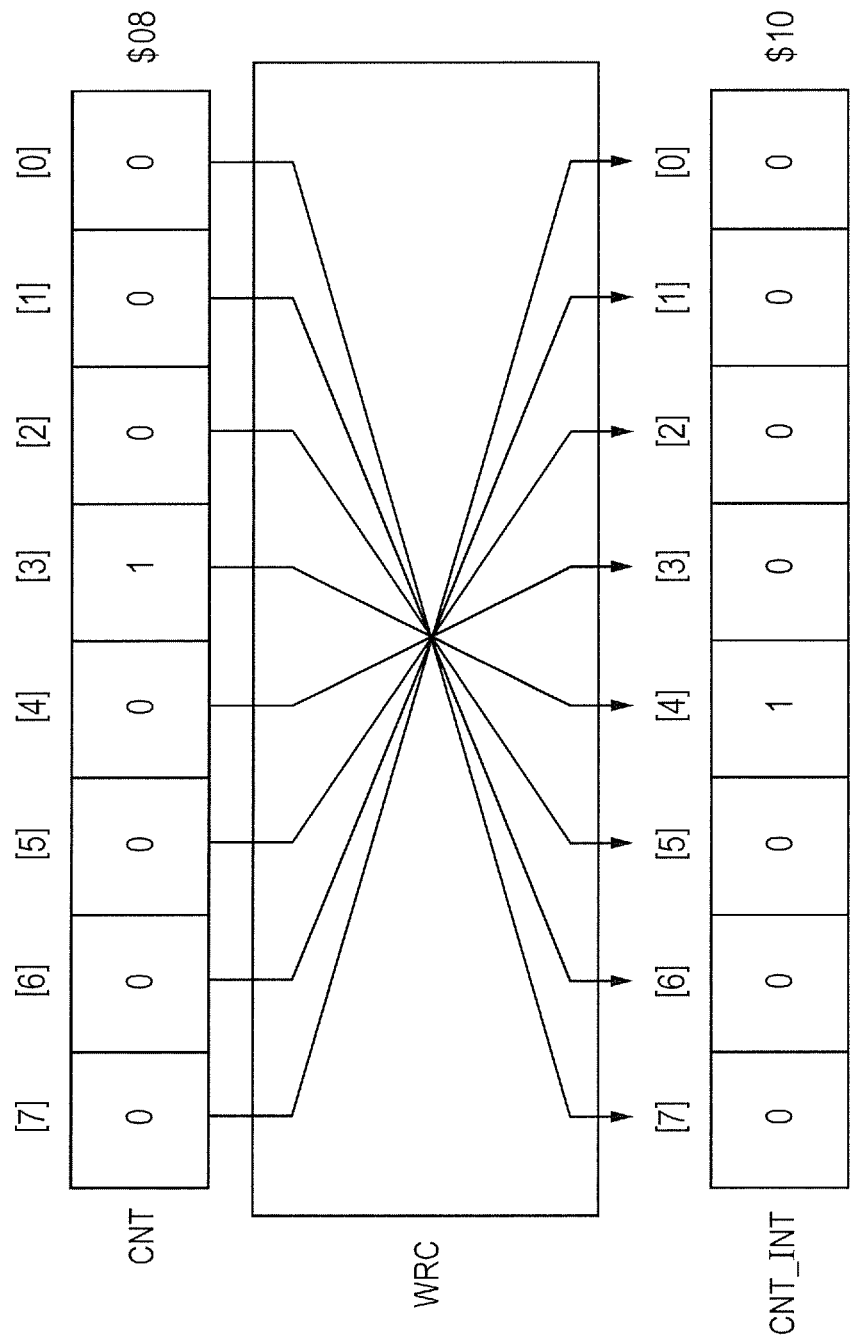
FIG. 5 is a concept view for use in describing a weight reversing circuit according to the first example.
Figure 8:
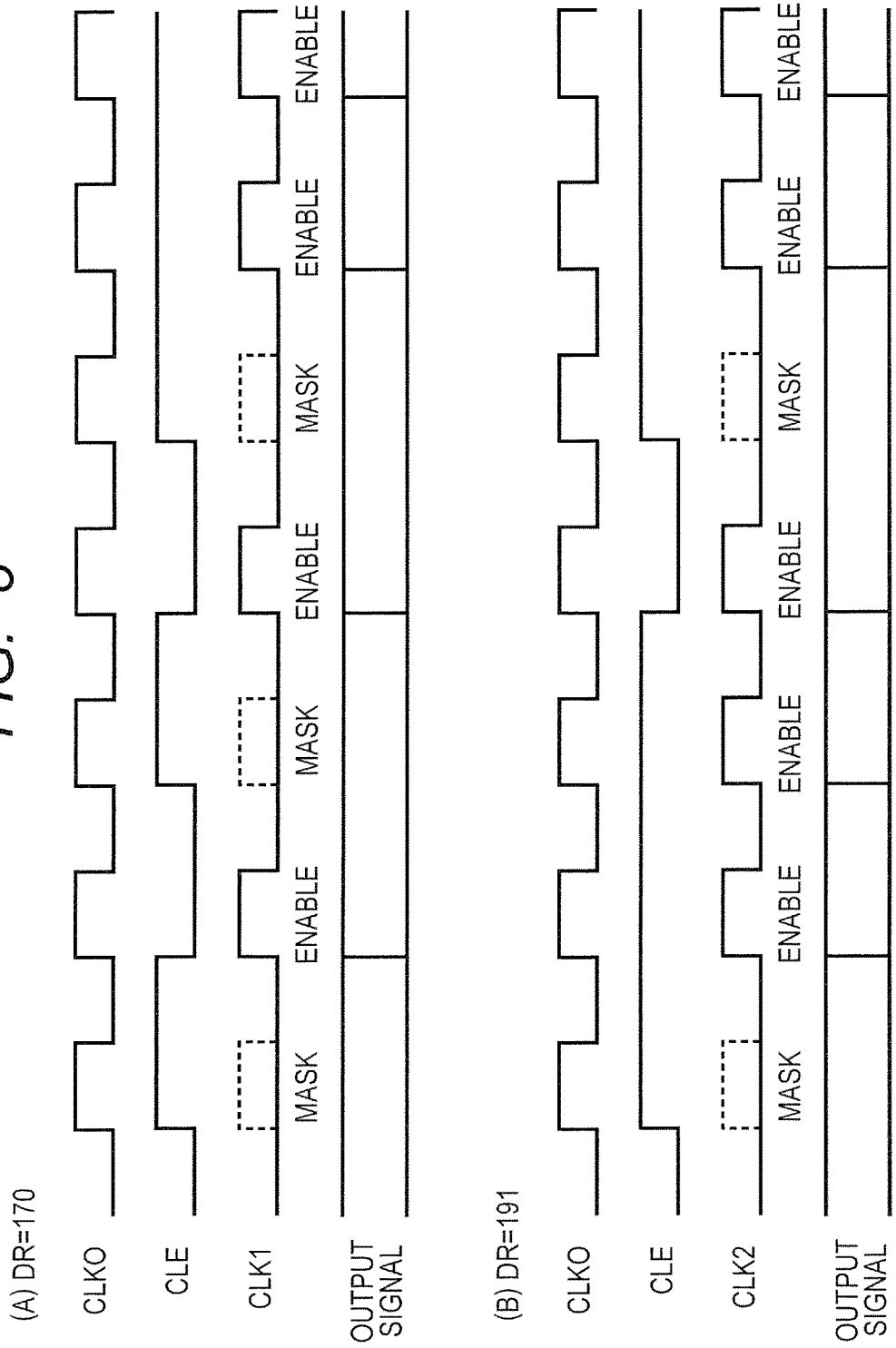
FIG. 8 is a timing chart for use in describing the clock signals generated by the clock generation circuit according to the first example.

Next, the clock generation circuit according to the example 1 will be described using FIGS. 3 to 9. FIG. 3 is a block diagram showing the structure of the clock generation circuit according to the example 1. FIG. 4 is a block diagram showing the structure of an enable generating unit and a clock gating unit according to the example 1. FIG. 5 is a view for use in describing a weight reversing circuit according to the example 1. FIG. 6 is a view for use in describing how to generate a clock enable signal. The example 1 is an example of the embodiment 1 and the embodiment 3.

As illustrated in FIG. 3, a clock generation circuit (CPG) 11 includes an oscillator (OSC) 110, a first enable generating unit (EN) 111-1 that is a control circuit, a first clock gating unit (CG) 112-1 that is an output circuit, a second enable generating unit (EN) 111-2 that is a control circuit, and a second clock gating unit (CG) 112-2 that is an output circuit. The oscillator 110 generates a source clock signal (hereinafter, abbreviated as "CLKO"). The oscillator 110 generates a source clock signal by a crystal vibrator mounted outside of the microcomputer 10 and in case of necessity, it may include a multiplication circuit and a divider such as PLL.

As illustrated in FIG. 4, the first enable generating unit 111-1 includes a counter (CNT) 21, a weight reversing circuit (WRC) 22, a comparator (CMP) 23, and a duty resister (DR) 24. The second enable generating unit 111-2 has the same structure as the first enable generating unit 111-1. The duty resister 24 is read and written by the CPU 12 through the internal bus 15. The counter 21 counts up at CLKO. The counter 21 and the duty resister 24 define, for example, 8 bits and the counter 21 counts the CLKO from 0 to 255. In comparison with the duty resister 24, the counter 21 activates a clock enable signal (hereinafter, abbreviated as "CKE") as a control signal, during a period specified by the duty resister 24, in one cycle of the counter 21 (unit of 256). The bit weight of the counter 21 is reversed by the weight reversing circuit 22 to smooth and activate (assert) the CKE and then to make a comparison by the comparator 23. Assume that the bit array of the output from the counter 21 is {CNT[7], . . . , CNT[1], CNT[0]}=CNT and that the bit array rearranged by the weight reversing circuit 22 is {CNT[0], CNT[1], . . . , CNT[7]}=CNT_INV=WRC. As illustrated in FIG. 5, for example, when the value of the counter 21 is $08, it is converted into $10 by the weight reversing circuit 22. Here, when the bit array of the duty resister 24 is defined as {DR[7], . . . , DR[1], DR[0]}=DR and DR≥CNT_INV, the CKE is activated. On the design, even when DR+CNT_INV≥255 (CNT_INV≥255−DR), the result is the same. When the counter 21 and the duty resister 24 is of n bits, the CKE is activated in the case of DR+CNT_INV≥$2^n$−1. In other words, when the total of DR and CNT_INV is the maximum value and more settable in the duty resister 24, the CKE is activated; when the total of DR and CNT_INV is less than the maximum value settable in the duty resister 24, the CKE is inactivated. The duty (obtained by dividing the pulse width by the pulse cycle) of the CKE is set in the duty resister 24.

Other than the above structure, the first enable generating unit 111-1 keeps the number of the CKE signals in the unit of 256 in the past, this is compared to the contents of the duty resister 24; when the number of the CKE signals in the unit of 256 in the past is the value or less stored in the duty resister 24, the CKE may be activated, while when it is more than the value stored in the duty resister 24, the CKE may be inactivated. The second enable generating unit 111-2 may be formed in the same way as the first enable generating unit 111-1.

As illustrated in FIG. 4, the first clock gating unit 112-1 includes an AND gate 25 and a latch 26. The latch 26 receives the CKE output from the first enable generating unit 111-1, with the reverse of CLKO as the clock signal. The AND gate 25 receives the CLKO and the output from the latch 26 to generate CLK1. When the CKE is at a high level (activated), the output of the CLKO is permitted (enabled) and a clock signal corresponding to the next CLKO is supplied. When the CKE is at a low level (inactivated), the output of the CLKO is prohibited (masked) and a clock signal corresponding to the next CLKO is not supplied (at a low level). According to this, the CLKO is supplied through the AND gate 25 during a high level period of the CKE and not supplied during a low level period of the CKE. A circuit of permitting or prohibiting the output of the CLKO is not restricted to the AND gate 25 but may be a NOR gate or a transfer gate. The second clock gating unit 112-2 has the same structure as the first clock gating unit 112-1, and CLK2 is generated according to the CKE and the CLKO supplied by the second enable generating unit 111-2.

On the way of delivering clock signals to each area and each circuit from the clock generation circuit 11, clock gating can be performed similarly to the conventional way, according to the logic of each circuit. For example, supply of the CLK1 to the first area may be stopped, to make the first area into a suspended state, and supply of the CLK1 to a part of the function block (for example, CPU) in the first area may be stopped, to make the CPU into a suspended state.

FIG. 6 is a view illustrating a concrete example of DR, WRC, and CNT. FIG. 7 is a view for use in describing the output form of the clock enable signals. FIG. 8(A) is a timing chart in the case of DR=170 in the first enable generating unit of the clock generation circuit according to the example 1. FIG. 8(B) is a timing chart in the case of DR=191 in the second enable generating unit of the clock generation circuit according to the example 1.

As mentioned above, when DR+CNT_INV≥255, the comparator 23 asserts the CKE. As illustrated in FIG. 6, for example, when the value set in the duty resister 24 is 2

(DR=2), the CKE is activated at the output values 253 to 255 (CNT_INV=253 to 255) of the weight reversing circuit 22 and at that time, the value of the counter 21 is 191, 127, and 255 (CNT=191, 127, and 255). In the case of DR=4, the CKE is activated at CNT_INV=251 to 255, and at that time, CNT=223, 63, 191, 127, and 255. In the case of DR=8, the CKE is activated at CNT_INV=247 to 255 and at that time, CNT=239, 31, 159, 95, 223, 63, 191, 127, and 255. In FIG. 7, a horizontal axis indicates the count value (CNT) of the counter 21 and a vertical axis indicates the set value (DR) of the duty resister 24. The CKE is activated at the position of ○ in FIG. 7. For example, in the case of DR=2, the CKE is activated at CNT=127, 191, and 255. Further, in the case of DR=63, the CKE is activated when the CNT is 3 plus multiple of 4, the CKE is activated. In the case of DR=127, the CKE is activated when the CNT is odd number. In the structure shown in FIG. 4, by reversing the bit weight of the counter 21 in the weight reversing circuit 22 (WRC), the positions of ○ are not localized on the horizontal axis and evenly arranged. In short, the activate state of the CKE is smoothed so that a deviation in the cycle may be small.

As illustrated in FIG. 8(A), when the set value of the duty resister 24 in the first enable generating unit 111-1 is 170 (DR=170), the CLKO is enabled (ENABLE) in twice of three CLKO times (171/256=about 67%) on average, to generate CLK1. In other words, CLKO is masked (MASK) in once of three CLKO times (85/256=about 33%) on average, not to generate CLK1. The first area where the CLK1 is supplied operates in synchronization with the rising edge of the CLK1 and the output signal (OUTPUT SIGNAL) is switched at the rising edge of the CLK1.

As illustrated in FIG. 8(B), when the set value of the duty resister 24 in the second enable generating unit 111-2 is set at 191 (DR=191), the CLKO is enabled (ENABLE) three times of four CLKO times (192/256=75%), to generate CLK2. In other words, the CLKO is masked (MASK) once of the four CLKO times (64/256=250%), not to generate CLK2. In the second area where CLK2 is supplied, operates in synchronization with the rising edge of the CLK2 and the output signal (OUTPUT SIGNAL) is switched at the rising edge of the CLK2.

Since the rising edges of the CLK1 and the CLK2 correspond to the rising edge of the CLKO, an interface between the first area and the second area has only to be designed in synchronization with the CLKO. It is true to the case of dividing the second area and interfacing a plurality of divisions in the example 2 described later.

By synchronization between the counters 21 in the respective areas through reset and initialization, the CKE having a larger value of the duty resister 24 (high speed) is to contain the CKE having a smaller value of the duty resister 24 (low speed), and therefore the low speed CKE does not have to wait for the high speed CKE, thereby making the interface easy.

MODIFIED EXAMPLE 1

Figure 9:
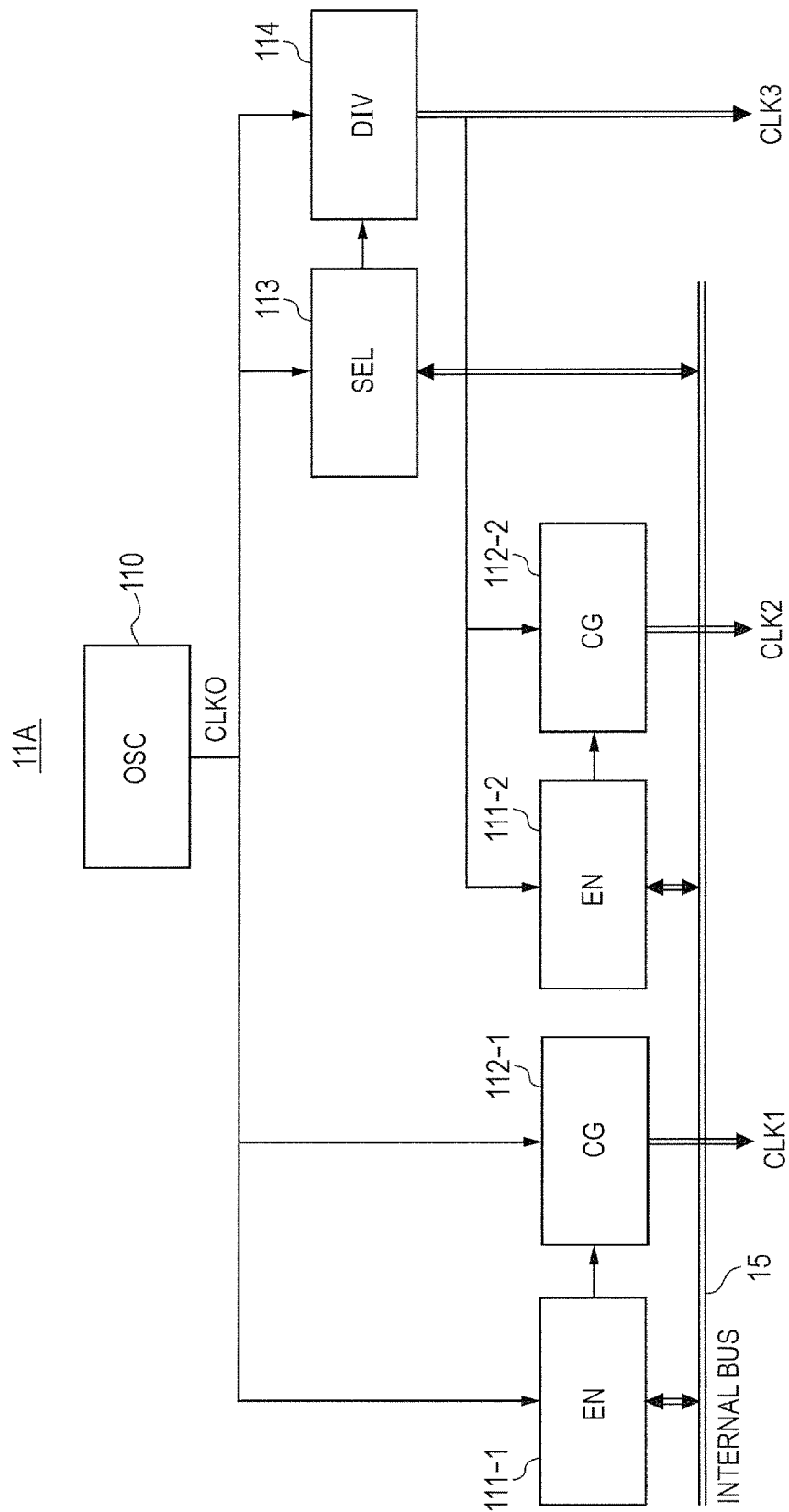
FIG. 9 is a block diagram for use in describing the clock generation circuit according to a first modified example.

A clock generation circuit according to a first modified example (modified example 1) of the example 1 will be described using FIG. 9. FIG. 9 is a block diagram showing the structure of the clock generation circuit according to the modified example 1.

The clock generation circuit (CPG) 11A according to the modified example 1 includes a divider (DIV) 114 and a divider selecting register (SEL) 113, other than the structure of the clock generation circuit 11. The divider (DIV) 114 divides a source clock (CLKO) and supplies it to the second enable generating unit (EN) 111-2 and the second clock gating unit (CG) 112-2. The clock generation circuit 11A supplies a clock signal (CLK3) for operation in the third area.

The third area includes a function block, not illustrated, in which a high level width of a signal is equal to a low level width thereof or the frequency of a clock signal has to be fixed at a constant, of the function block included in the peripheral circuit 14. At a proper division ratio, a clock signal having a constant frequency agreed in a high level width and a low level width can be supplied.

Further, instead of the CLKO, the second area clock (CLK2) is generated based on the third area clock (CLK3).

MODIFIED EXAMPLE 2

Figure 10:
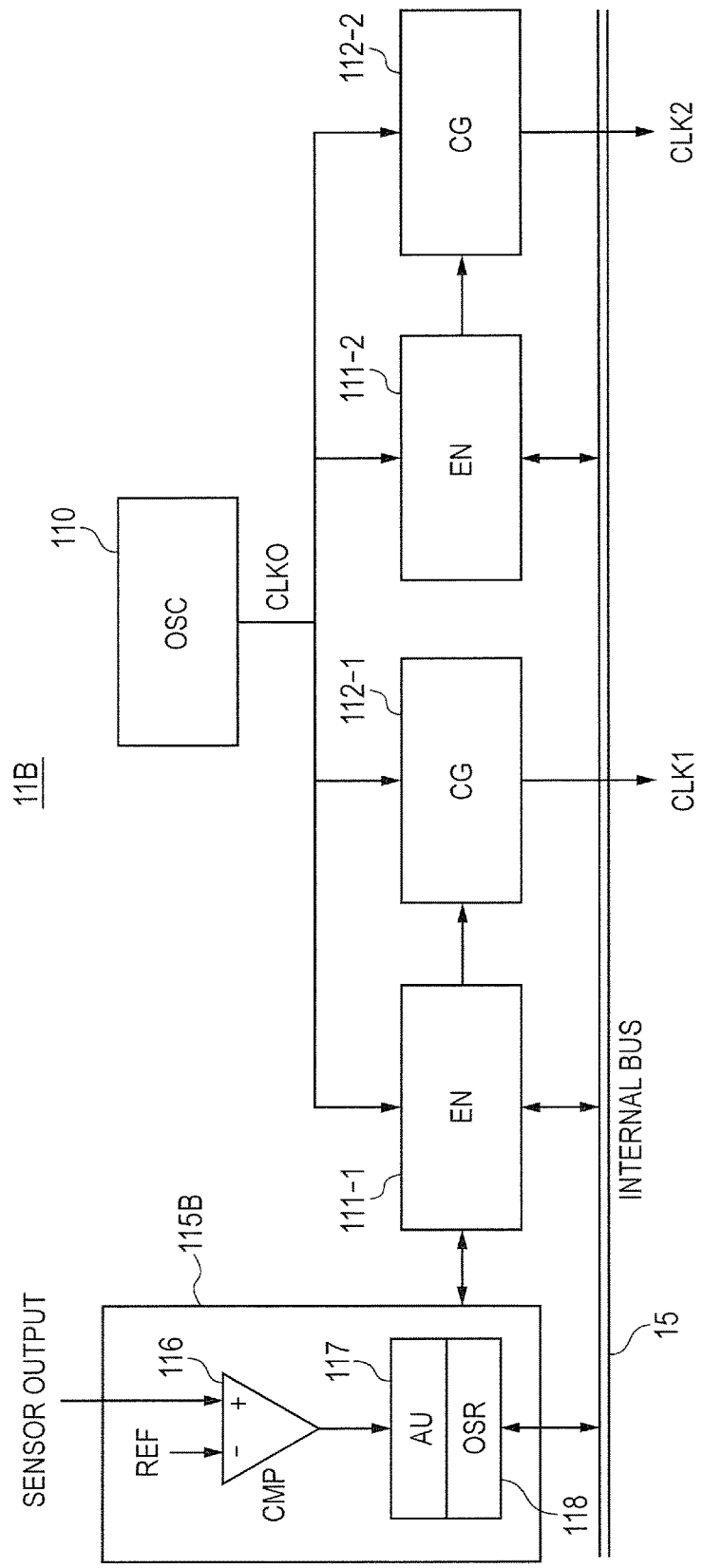
FIG. 10 is a block diagram for use in describing a clock generation circuit according to a second modified example.

A clock generation circuit according to a second modified example (modified example 2) of the example 1 will be described using FIG. 10. FIG. 10 is a block diagram showing the structure of the clock generation circuit according to the modified example 2. The modified example 2 is an example of the embodiment 2.

The clock generation circuit 11B according to the modified example 2 controls the first enable generating unit (EN) 111-1 with an alteration circuit 115B added to the clock generation circuit 11. The alteration circuit 115B includes a comparator (CMP) 116, an arithmetic unit (AU) 117, and an off-set register (OSR) 118. The comparator 116 receives the output signal (SENSOR OUTPUT) from the sensor such as voltage and temperature, although it is not particularly restrictive, included in the peripheral circuit 14. The comparator 116 compares this with the reference value (REF). In the case of a voltage, the comparator 116 detects the voltage supplied to the first area lower than the reference value (REF). In the case of a temperature, it detects the temperature higher than the reference value (REF). Upon this detection, the comparator 116 instructs the arithmetic unit 117 to subtract the value of the off-set register 118 from the contents of the duty resister 24. According to this, generation of the pulse number of the CLK1 is reduced, hence to reduce the current consumption. According to this, a drop in the voltage and a rise in the temperature can be recovered. When detecting the voltage supplied to the first area higher than the reference value (REF) and when detecting the temperature lower than the reference value (REF), the comparator 116 instructs the arithmetic unit 117 to add the value of the off set register 118 to the contents of the duty resister 24. The second enable generating unit (EN) 111-2 can be controlled by the alteration circuit 115B similarly to the first enable generating unit (EN) 111-1.

A target for detection by a sensor may be an interrupt request signal and the requested number of the interrupt request signals. For example, when the requested number of the interrupt request signals is more than the reference value (REF), the comparator 116 instructs the arithmetic unit 117 to add the value of the off set register 118 to the contents of the duty resister 24 to increase the generation of the pulse number of CLK1 and to enhance the processing performance. When the requested number of the interrupt request signals is less than the reference value (REF), the comparator 116 instructs the arithmetic unit 117 to subtract the value of the off set register 118 from the contents of the duty resister 24, hence to reduce the power consumption.

As a target for detection by a sensor, an interrupt mask level can be used or when a data transfer device such as DMA controller is included, its start request signal and bus right request signal may be used. Further, as a target for detection by a sensor, a communication state such as SCI can be used. Their combination can be also used. In any case, when improving the processing performance, generation of the pulse number of the clock signal can be increased, and in the case of not requiring much processing performance, generation of the pulse number of the clock signal can be reduced to reduce the current consumption. This can be finely controlled. The reference value (REF) may be fixedly generated by hardware or may be settable by software.

MODIFIED EXAMPLE 3

Figure 11:
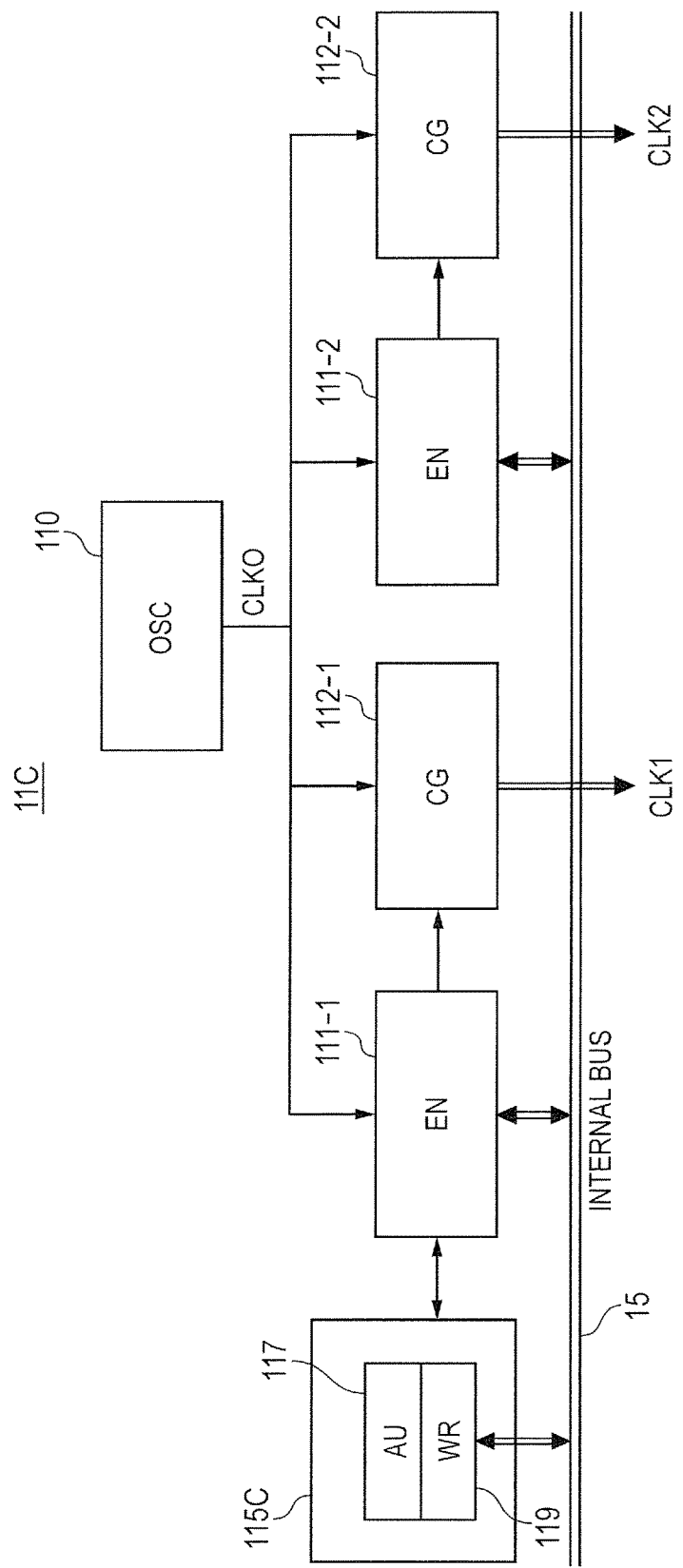
FIG. 11 is a block diagram for use in describing a clock generation circuit according to a third modified example.
Figure 12:
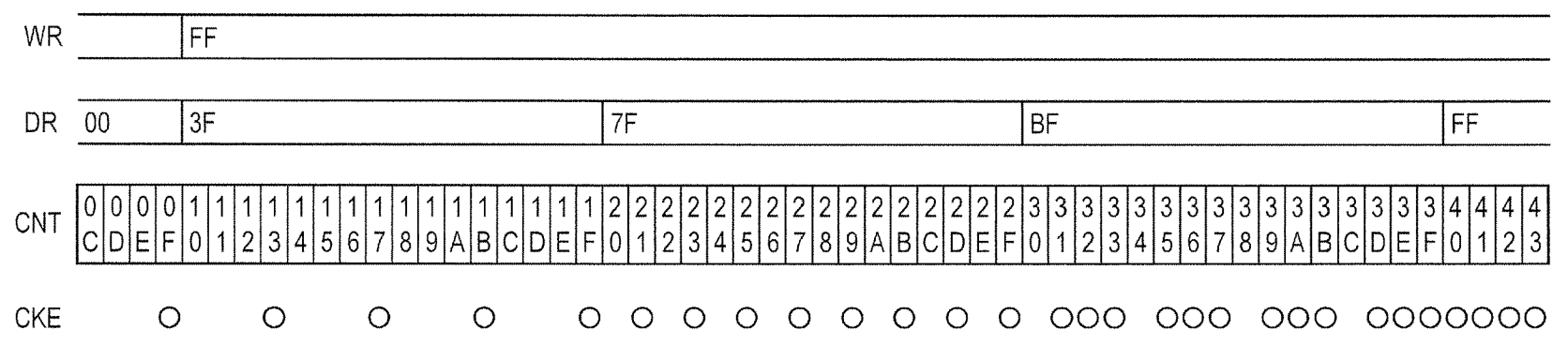

A clock generation circuit according to a third modified example (modified example 3) of the example 1 will be described using FIGS. 11 and 12. FIG. 11 is a block diagram showing the structure of the clock generation circuit according to the modified example 3. FIG. 12 is a timing chart showing the timing of the clock generation circuit according to the modified example 3. The modified example 3 is an example of the embodiment 2.

The clock generation circuit (CPG) 11C according to the modified example 3 controls the first enable generating unit (EN) 111-1 with an alteration circuit 115C added to the clock generation circuit 11. The alteration circuit 115C includes the arithmetic unit (AU) 117 and the write data register (WR) 119. The data written into the write data register 119 is not transferred directly to the duty resister 24 of the first enable generating unit 111-1 but the arithmetic unit 117 increments the contents of the duty resister 24 of the first enable generating unit 111-1 until it becomes the contents of the write data register 119. Increment is performed at a predetermined interval with a predetermined width. According to this, a change of the supplied clock signal (CLK1) for operation to the first area can be decreased and a change of the power consumption can be decreased.

For example, when the first area is shifted from the suspension state to the operation state, just after the shift to the operation state, the contents of the duty resister 24 of the first enable generating unit 111-1 can be set small and similarly, the contents of the duty resister 24 can be incremented by the arithmetic unit 117. When the first area is shifted from the operation state to the suspension state, conversely decrement can be performed into the suspension state. The second enable generating unit (EN) 111-2 can be controlled by the alteration circuit 115C, similarly to the first enable generating unit (EN) 111-1.

For example, in a state of setting the duty resister 24 at $00, $FF is written into the write data register 119. In this case, in the example, the lower 6 bits ($3F) in the write data register is used as it is, the upper 2 bits is incremented by the arithmetic unit 117 in every 01, and the contents of the duty resister 24 are changed as $00→$3F→$7F→$BF→$FF. This change is set to occur when the lower 4 bits of the counter 21 is 0000. Since the duty of the clock enable signal (CKE) changes for every 16 clocks like 25%→50%→75%→100%, it is possible to suppress a rapid change of the operation current. The increment value of the duty resister 24 and the time interval can be arbitrarily changed.

EXAMPLE 2

Figure 13:
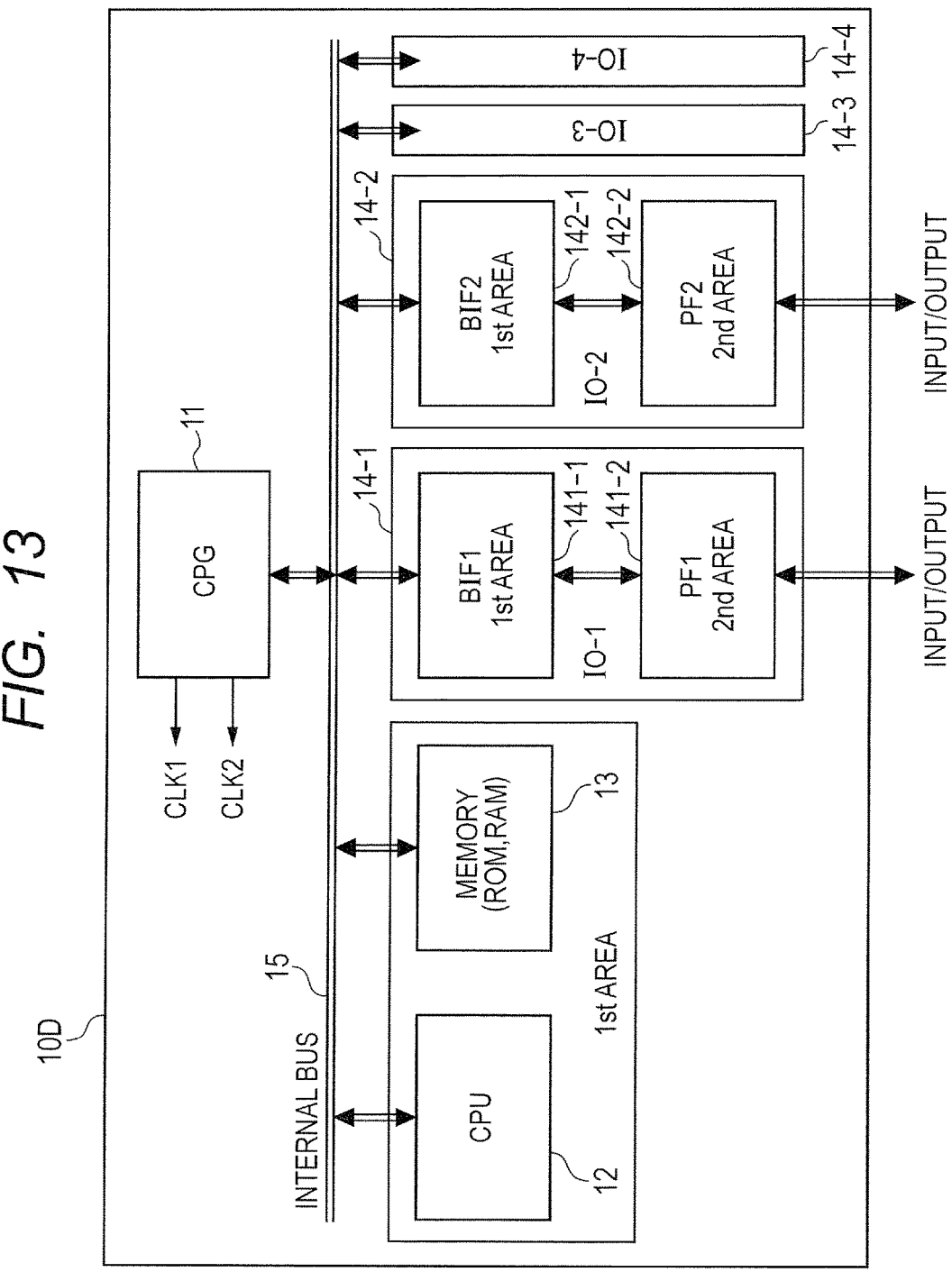
FIG. 13 is a block diagram for use in describing a microcomputer according to a second example.

A microcomputer according to a second example (example 2) of the embodiment will be described using FIG. 13. FIG. 13 is a block diagram showing the microcomputer according to the example 2.

The microcomputer 10D according to the example 2 is fundamentally the same as the microcomputer 10 according to the example 1 except for the peripheral circuit (IO). The microcomputer 10D includes a plurality units of IO, and a first peripheral circuit (IO-1) 14-1 illustrated by way of example is divided into a bus interface unit (BIF) 141-1 and a peripheral functional unit (PF) 141-2. Further, a second peripheral circuit (IO-2) 14-2 is divided into a bus interface unit (BIF) 142-1 and a peripheral functional unit (PF) 142-2. For example, the first peripheral circuit 14-1 and the second peripheral circuit 14-2 are a timer or a SCI. In the case of timer, the peripheral functional unit 141-2 includes a function of timer such as a counter, a compare register, and a comparator. In the case of SCI, the peripheral functional unit 142-2 includes a function of serial communication such as a data register and a shift register.

In the microcomputer 10D, set value of the duty resister 24 in the first enable generating unit (EN) 111-1 is used with the above set value not less than the set value of the duty resister 24 in the second enable generating unit (EN) 111-2.

The first bus interface unit 141-1 and the second bus interface unit 142-1 are to be in the first area, where operation is performed with the same clock signal (CLK1) as the CPU 12. According to this, efficient read and write can be realized without overhead at a bus access.

In read, the internal IO registers included in the first peripheral functional unit 141-2 and the second peripheral functional unit 142-2 may be selected by the first bus interface unit 141-1 and the second bus interface unit 142-1 and supplied to the internal bus 15. In write, the data given through the internal bus 15 may be synchronized with the clock enable in the second area and supplied to the first peripheral function unit 141-2 and the second peripheral function unit 142-2. In this case, the write operation is completed with delay, and therefore, when the next write is requested prior to this completion, the next write cannot be executed undesirably or can be in a wait state. On the contrary, when a necessity of continuous write is high, the internal IO register is included in the first bus interface unit 141-1 and the second bus interface unit 142-1 and the write is to be completed at CLK1, thereby enabling the continuous write.

The first peripheral functional unit 141-2 and the second peripheral functional unit 142-2 set the duty resister 24 of the second enable generating unit 111-2 according to the function and the use method, and low power consumption can be achieved by reducing the clock enable signal (CKE). Although the first bus interface unit 141-1 and the second bus interface unit 142-1 operate at CLK1, their logic size is fairly smaller than that of the first peripheral functional unit 141-2 and the second peripheral functional unit 142-2, which will not disturb the effect of the low power consumption by decreasing the CKE of the second enable generating unit 111-2. Further, the clock signal of the first bus interface unit 141-1 and the second bus interface unit 142-1 may be enabled by the corresponding IO selection signal of the internal bus 15. In this case, the bus access is the same clock signal as the first bus interface unit 141-1 and the second bus interface unit 142-1, and when no bus access is performed, clock gating can be easily performed and the power consumption can be reduced in the first bus interface unit 141-1 and the second bus interface unit 142-1. Since the frequency of bus access to one peripheral circuit (IO) is very small, lower power consumption can be achieved than in the case of setting the whole peripheral circuit (IO) as the second area.

The microcomputer 10D can use the clock generation circuit 11A of the modified example 1, the clock generation circuit 11B of the modified example 2, or the clock generation circuit 11C of the modified example 3, instead of the clock generation circuit 11.

According to the above examples and modified examples, the following functional effects can be obtained.

(1) Duty is made settable and by enabling the clock signal according to the duty, performance and power consumption can be set finely. By comparison of the duty with the counter, a good responsibility can be achieved. By reversing the weight of each counter for comparison, a deviation of the clock signal can be eliminated and a change of the power consumption can be reduced. By supplying several kinds of clock signals, setting can be performed in accordance with the specification and application operation of the microcomputer. Compared with the case of switching a plurality of clock signals, a simpler and smaller sized circuit can be achieved and a switching control and circuit can be simplified.

(2) According to the invention, it is possible to set the performance and power consumption finely and simplify the power supply and the thermal design of a system using a microcomputer. Alternatively, depending on the restriction of the power supply or the thermal design, it is possible to set the performance and the power consumption finely.

(3) A circuit for detecting voltage and temperature enables it to control the duty. According to this, before arriving at an undesirable malfunction, power consumption can be reduced. Margin at a time of system design can be reduced, hence to make the system efficient.

(4) By making the control of the above (1) to (3) easy and automatically executing the same, software development and a program for the development cannot be required. Reduction in the program contributes the reduction in the power consumption.

(5) When the power consumption of the microcomputer changes, by gradually changing the duty, the change of the power consumption can be relieved and the internal or external power design can be made easy and simple. This is effective in reducing the cost.

(6) Interfaces between several kinds of clock signals can be designed generally in synchronization, hence to make the interface design easy and to achieve a simple structure.

As mentioned above, although the invention made by the inventor et al. has been described concretely according to the embodiments, examples, and modified examples, it is needless to say that the invention is not restricted to the above embodiments, examples, and modified examples but various modifications are possible.

For example, the detailed structure of the microcomputer can be arbitrarily changed. Any type and any number of the peripheral circuits (IO) can be used. The number of the areas where the clock signal is supplied is not restricted to 2 or 3 but it can be arbitrarily increased.

A generation method of a source clock can be arbitrarily changed. A plurality of oscillators may be provided, from which a source clock signal also can be selected.

When the clock generation circuit generates a plurality of clock signals, by sharing a counter (CNT) among a plurality of enable generating units, the clock generation circuit may be provided with only one counter (CNT).

The bit number of the counter (CNT) and the duty resister (DR) may be arbitrarily changed. The bit number of the counter (CNT) and the duty resister (DR) may be changed in every enable generating unit.

Through data transfer by a data transfer device in reply to the output from a sensor such as voltage and temperature, duty resister (DR) may be set.

The concrete circuit for clock gating can be changed and the setting of clock area and clock tree structure can be arbitrarily changed.

In the above, mainly the case of applying the invention made by the inventor et al. to a single chip microcomputer that is an applicable field has been described; however, it is not restricted to this but a part of a memory may be provided outside of the microcomputer. It may be applied to other semiconductor device, for example, a semiconductor device based on a digital signal processor (DSP), and the invention can be applied at least to a semiconductor device having a logical structure synchronized with a clock.

What is claimed is:

1. A semiconductor device comprising:
a clock generation circuit that generates a clock signal;
a data processing unit that receives the clock signal,
wherein the clock generation circuit includes:
  an oscillator that generates a source clock signal,
  an output circuit that outputs the clock signal with the source clock signal enabled, and
  a control circuit provided with a setting circuit in which the data processing unit sets a ratio of enable for the source clock signal,
wherein the clock generation circuit generates the clock signal which is supplied to an area including the data processing unit by partially enabling or disabling the source clock signal;
a bus that is coupled to the clock generation circuit and the data processing unit,
wherein the clock generation circuit includes an alteration circuit capable of changing contents of the setting circuit based on detection results; and
a detecting circuit that detects a state of the semiconductor device,
wherein the alteration circuit performs addition or subtraction on the contents of the setting circuit based on a detection result by the detecting circuit.

2. The device according to claim 1,
wherein the detecting circuit detects a voltage, and
wherein the control circuit is provided with the setting circuit in which the data processing unit sets the ratio of an enable signal for permitting the source clock signal, and
wherein a frequency of the clock signal is changed through partially permitting or prohibiting the source clock signal in time.

3. The device according to claim 1,
wherein the detecting circuit detects a temperature.

4. The device according to claim 1,
wherein the alteration circuit includes
a comparator that compares the detection result of the detecting circuit with a predetermined reference value,
a register that is set by the data processing unit through the bus, and
an arithmetic unit that adds the contents of the register to the contents of the setting circuit or subtracts the contents of the register from the contents of the setting circuit, based on the comparison result of the comparator.

5. The device according to claim 1,
wherein the alteration circuit gradually changes a ratio of enable between the current ratio of enable in the setting circuit and a target ratio of enable.

6. The device according to claim 1,
wherein the control circuit includes
a counter that counts the source clock signal,
a weight reversing circuit that changes a weight of the counter, and
a comparator that compares the contents of the weight reversing circuit with the contents of the setting circuit,
wherein based on the comparison result of the comparator, an enable signal for enabling the source clock signal is generated.

7. The device according to claim 6,
wherein the output circuit includes
a latch circuit that latches the enable signal by a reverse signal of the source clock signal, and
a logical gate that receives the source clock signal and an output signal from the latch circuit.

8. The device according to claim 1, wherein the clock generation circuit generates the clock signal which is supplied to an area of operation including the data processing unit by partially enabling or disabling the source clock signal by changing the ratio of enable for the source clock signal set by the data processing unit of the source clock signal, the data processing unit including a processor, and
wherein the ratio of enable between a current ratio of enable in the setting circuit and a target ratio of enable is changed gradually.

9. A semiconductor device comprising:
a clock generation circuit that generates a clock signal;
a data processing unit that receives the clock signal,
wherein the clock generation circuit includes:
an oscillator that generates a source clock signal,
an output circuit that outputs the clock signal with the source clock signal enabled, and
a control circuit provided with a setting circuit in which the data processing unit sets a ratio of enable for the source clock signal,
wherein the clock generation circuit generates the clock signal which is supplied to an area including the data processing unit by partially enabling or disabling the source clock signal;
a bus that is coupled to the clock generation circuit and the data processing unit,
wherein the clock generation circuit includes an alteration circuit capable of changing contents of the setting circuit based on detection results,
wherein the alteration circuit gradually a ratio of enable between the current ratio of enable in the setting circuit and a target ratio of enable,
wherein the alteration circuit includes
a register in which the data processing unit sets a target value of (m+n) bit length of the setting circuit through the bus, and
an arithmetic unit that increments or decrements the contents of the setting circuit,
wherein the arithmetic unit increments or decrements the contents of the setting circuit to a predetermined value with a lower n bits of the target value set in the register fixed,
so that the value of the setting circuit is gradually increased or decreased to the target value.

10. A semiconductor device comprising:
a clock generation circuit that generates first and second clock signals;
a first area that is operated with the first clock signal; and
a second area that is operated with the second clock signal,
wherein the clock generation circuit includes
an oscillator that generates a source clock signal,
a first clock control circuit that generates a first control signal including a first duty,
a first clock output circuit capable of outputting the first clock signal by partially permitting or prohibiting the source clock signal based on the first control signal,
a second clock control circuit that generates a second control signal including a second duty, and
a second clock output circuit capable of outputting the second clock signal by partially permitting or prohibiting the source clock signal based on the second control signal,
wherein each of the first and second clock control circuits includes
a counter that counts the source clock signal,
a weight reversing circuit that changes a weight of the counter,
a register that keeps duties of the first and the second control signals, and
a comparator that compares an output front the weight reversing circuit with the contents of the register, and
wherein based on the comparison result of the comparator, an enable signal for permitting an output of the source clock signal is generated.

11. The device according to claim 10,
wherein each of the first and the second areas is operated in synchronization with a rising edge of the source clock signal.

12. The device according to claim 11,
wherein the first area includes a CPU and the second area includes a peripheral circuit.

13. The device according to claim 11,
wherein the first area includes a CPU and a bus interface unit for a peripheral circuit, and the second area includes a peripheral function unit of the peripheral circuit.

14. The device according to claim 10,
wherein when a total of a value of the weight reversing circuit and a value of the register is greater than or equal to the maximum value settable in the register, the enable signal is asserted, and
wherein when the above total is smaller than the above maximum value, the enable signal is negated.

15. The device according to claim 14,
wherein each of the first and the second clock output circuits includes
a latch circuit that latches the enable signal with a reverse signal of the source clock signal, and
a logical gate that receives the source clock signal and an output signal from the latch circuit.

16. The device according to claim 10,
wherein the contents of the register are to be set by a CPU.

17. The device according to claim 10, further comprising
a bus coupled to the clock generation circuit and the data processing unit,
wherein the clock generation circuit includes an alteration circuit capable of changing the contents of the register.

18. The device according to claim 17,
wherein the alteration circuit performs addition or subtraction on the contents of the register.

* * * * *